United States Patent
Fujiwara et al.

(10) Patent No.: US 8,670,912 B2
(45) Date of Patent: Mar. 11, 2014

(54) ATTITUDE CHANGE REDUCTION STRUCTURE

(75) Inventors: Shinichi Fujiwara, Toyota (JP); Kohei Kozono, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 145 days.

(21) Appl. No.: 13/393,024

(22) PCT Filed: Sep. 7, 2010

(86) PCT No.: PCT/IB2010/002230
§ 371 (c)(1),
(2), (4) Date: Feb. 28, 2012

(87) PCT Pub. No.: WO2011/036527
PCT Pub. Date: Mar. 31, 2011

(65) Prior Publication Data
US 2012/0173105 A1    Jul. 5, 2012

(30) Foreign Application Priority Data
Sep. 24, 2009    (JP) ................................. 2009-219622

(51) Int. Cl.
*B60T 17/04* (2006.01)
*B60T 17/22* (2006.01)

(52) U.S. Cl.
USPC .......................................... 701/70; 303/146

(58) Field of Classification Search
None
See application file for complete search history.

(56) References Cited

U.S. PATENT DOCUMENTS

| 5,407,258 A | | 4/1995 | Giers et al. | |
| 5,893,896 A | * | 4/1999 | Imamura et al. | ................ 701/70 |
| 6,027,183 A | * | 2/2000 | Katayose et al. | ............ 303/146 |
| 6,089,680 A | * | 7/2000 | Yoshioka et al. | ............. 303/146 |

FOREIGN PATENT DOCUMENTS

| EP | 0 716 969 A1 | 6/1996 |
| JP | 5-262213 A | 10/1993 |
| JP | 06-087425 A | 3/1994 |
| JP | 2000-046255 A | 2/2000 |
| JP | 2008-037259 A | 2/2008 |

OTHER PUBLICATIONS

International Search Report and Written Opinion for corresponding International Patent Application No. PCT/IB2010/002230 mailed Dec. 15, 2010.

Japanese Office Action for corresponding JP Patent Application No. 2009-219622 issued on Jan. 4, 2012.

* cited by examiner

*Primary Examiner* — Michael J Zanelli
(74) *Attorney, Agent, or Firm* — Sughrue Mion, PLLC

(57) ABSTRACT

An attitude change reduction structure, which reduces a vehicle attitude change that occurs during braking due to known left-right asymmetry of a vehicle structure, includes a brake pressure control mechanism that increases a brake pressure at a brake for a wheel (9) on a right side and a brake pressure at a brake for a wheel (9) on a left side to a same target brake pressure; and a brake pressure change rate differentiation structure that makes a rate of change in the brake pressure at the brake for the wheel (9) on the right side with respect to time different from a rate of change in the brake pressure at the brake for the wheel (9) on the left side with respect to time, based on the known left-right asymmetry of the vehicle structure.

10 Claims, 4 Drawing Sheets

ATTITUDE CHANGE REDUCTION STRUCTURE

BACKGROUND OF THE INVENTION

1. Field of the Invention

The invention relates to a structure that reduces a vehicle attitude change that occurs during braking, and in particular, relates to a structure that reduces a vehicle attitude change that occurs during braking due to left-right asymmetry of a vehicle structure.

2. Description of the Related Art

Japanese Patent Application Publication No. 05-262213 (JP-A-05-262213) describes a braking force distribution control method in which different braking forces for respective wheels are generated depending on the traveling condition of a four-wheel vehicle. In the braking force distribution control method, braking forces are distributed so that the braking forces for the right and left sides of the vehicle are constantly equal during braking of the vehicle when the vehicle travels straight forward, whereby generation of a yaw moment is avoided when the vehicle travels straight forward.

Japanese Patent Application Publication No. 2008-37259 (JP-A-2008-37259) describes a driving control device that cancels out a yaw moment that is generated during braking due to left-right asymmetry of a vehicle structure (for example, a vehicle weight distribution, a difference between the length of a pipe that supplies a brake pressure to a right wheel and the length of a pipe that supplies a brake pressure to a left wheel, or a difference between dynamic loaded radii of right and left tires due to a difference between tire pressures in the right and left tires). The driving control device generates a counter yaw moment using a difference between braking forces for the right and left wheels, while controlling the braking forces for the right and left wheels separately by using an electronic control unit based on outputs from pressure sensors that detect the brake pressures at respective brakes for the right and left wheels.

However, each of the technologies described in JP-A-05-262213 and JP-A-2008-37259 relates to a structure in which the braking forces for the right and left wheels are separately controlled, and does not relate to a structure in which the braking forces for the right and left wheels are integrally controlled.

SUMMARY OF THE INVENTION

The invention provides an attitude change reduction structure that reduces a vehicle attitude change that occurs during braking while braking forces for wheels on right and left sides are integrally controlled.

An aspect of the invention relates to an attitude change reduction structure that reduces a vehicle attitude change that occurs during braking due to known left-right asymmetry of a vehicle structure. The attitude change reduction structure includes a brake pressure control mechanism that increases a brake pressure at a brake for a wheel on a right side and a brake pressure at a brake for a wheel on a left side to a same target brake pressure; and a brake pressure change rate differentiation structure that makes a rate of change in the brake pressure at the brake for the wheel on the right side with respect to time different from a rate of change in the brake pressure at the brake for the wheel on the left side with respect to time, based on the known left-right asymmetry of the vehicle structure.

With this configuration, in the attitude change reduction structure, while the brake pressure control mechanism controls the brake pressures in a manner such that the target brake pressures for the wheels on the right and left sides are the same, the brake pressure change rate differentiation structure generates a force for canceling out the vehicle attitude change that occurs during braking due to the known asymmetry of the vehicle structure. Thus, the attitude change reduction structure reduces the vehicle attitude change that occurs during braking.

In the above-described aspect, when a vehicle is deflected toward one of the right and left sides during braking due to the known left-right asymmetry of the vehicle structure, the brake pressure change rate differentiation structure may make the rate of change in the brake pressure at the brake for the wheel on one of the right and left sides with respect to time greater than the rate of change in the brake pressure at the brake for the wheel on the other of the right and left sides with respect to time.

With this configuration, the brake pressure change rate differentiation structure increases the brake pressure at the brake for the wheel on one of the right and left sides to the target brake pressure more quickly than the brake pressure at the brake for the wheel on the other of the right and left sides, thereby causing a difference between the brake pressures until the brake pressure at the brake for the wheel on the other of the right and left sides reaches the target brake pressure. Thus, the brake pressure change rate differentiation structure generates a force for canceling out the vehicle attitude change that occurs during braking due to the known left-right asymmetry of the vehicle structure.

In the above-described aspect, the brake pressure change rate differentiation structure may include brake hoses on the right and left sides, and an amount of expansion of the brake hose on the right side is different from an amount of expansion of the brake hose on the left side; and the amount of expansion of the brake hose on one of the right and left sides may be smaller than the amount of expansion of the brake hose on the other of the right and left sides so that the rate of change in the brake pressure at the brake for the wheel on the one of the right and left sides with respect to time is greater than the rate of change in the brake pressure at the brake for the wheel on the other of the right and left sides with respect to time.

With this configuration, in the brake pressure change rate differentiation structure, the brake hose for the wheel on the one of the right and left sides expands less than the brake hose for the wheel on the other of the right and left sides. Therefore, the brake pressure change rate differentiation structure increases the brake pressure for the wheel on the one of the right and left sides to the target brake pressure more quickly than the brake pressure for the wheel on the other of the right and left sides, thereby causing a difference between the brake pressures until the brake pressure for the wheel on the other of the right and left sides reaches the target brake pressure. Thus, the brake pressure change rate differentiation structure generates a force for canceling out the vehicle attitude change that occurs during braking due to the known left-right asymmetry of the vehicle structure In the above-described aspect, the known left-right asymmetry of the vehicle structure may be a difference between a load applied to the wheel on the right side and a load applied to the wheel on the left side; and the brake pressure change rate differentiation structure may make the rate of change in the brake pressure at the brake for the wheel, to which a larger load is applied, with respect to time greater than the rate of change in the brake pressure at the brake for the wheel, to which a smaller load is applied, with respect to time.

With this configuration, the brake pressure change rate differentiation structure increases the brake pressure at the brake for the wheel, to which a lager load is applied, to the target brake pressure more quickly than the brake pressure at the brake for the wheel to which a smaller load is applied. Thus, a difference is caused between the brake pressures until the brake pressure at the brake for the wheel, to which a smaller load is applied, reaches the target brake pressure. Therefore, the brake pressure change rate differentiation structure generates a force for canceling out the vehicle attitude change that occurs during braking due to the known left-right asymmetry of the vehicle structure.

In the above-described aspect, the target brake pressure may be determined based on a depression amount of a brake pedal.

With this configuration, the brake pressure control mechanism controls the brake pressures in a manner such that the target brake pressures for the wheels on the right and left sides are the same value that is determined based on the depression amount of the brake pedal.

With the above-described aspect, the invention provides the structure that reduces the vehicle attitude change that occurs during braking, while braking forces for the wheels on the right and left sides are integrally controlled.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Hereinafter, embodiments of the invention will be described with reference to the drawings.

Figure 1:
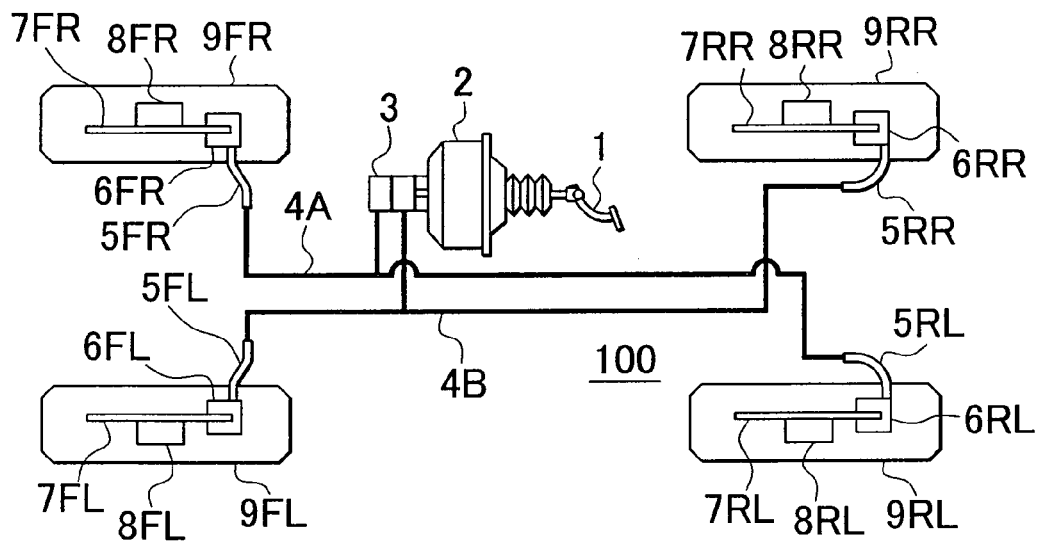
FIG. 1 shows an example of a configuration of an attitude change reduction structure according to an embodiment of the invention.

FIG. 1 shows a brake pedal 1, a brake booster 2, a brake master cylinder 3, brake tubes 4, brake hoses 5, brake calipers 6, brake rotors 7, wheel hubs 8, and wheels 9, which will be described below.

Note that the brake hoses 5 include a brake hose 5FL for a front-left wheel (hereinafter, referred to as "front-left wheel brake hose 5FL"), a brake hose 5FR for a front-right wheel (hereinafter, referred to as "front-right wheel brake hose 5FR"), a brake hose 5RL for a rear-left wheel (hereinafter, referred to as "rear-left wheel brake hose 5RL"), and a brake hose 5RR for a rear-right wheel (hereinafter, referred to as "rear-right wheel brake hose"). The brake hoses for the four wheels are collectively referred to as the brake hoses 5. Similarly, the brake calipers for the four wheels are collectively referred to as the brake calipers 6, the brake rotors for the four wheels are collectively referred to as the brake rotors 7, the wheel hubs for the four wheels are collective referred to as the wheel hubs 8, and the four wheels are collectively referred to as the wheels 9.

In order to cancel out a yaw moment generated during braking due to a difference between loads applied to right and left wheels, for example, an attitude change reduction structure 100 generates a counter yaw moment using a difference between brake pressures at right and left brakes until the brake pressures reach a target brake pressure, thereby reducing deflection of a vehicle that occurs during braking.

Note that the difference between loads applied to the right and left wheels is a known characteristic that is determined, for example, by the arrangement of an engine, a transmission, and the like, in the vehicle.

The brake pedal 1 receives a brake operation performed by a driver. The brake pedal 1 increases a depression force input to the brake pedal 1 and transmits the increased depression force to the brake booster 2 based on the principle of leverage.

The brake booster 2 further increases the brake pedal depression force input to the brake pedal 1 and transmits the force to the brake master cylinder 2. For example, the brake booster 2 further increases the brake pedal depression force using hydraulic pressure based on the Pascal's principle, and transmits the increased brake pedal depression force to the piston(s) of the brake master cylinder 3.

The brake master cylinder 3 is a device that generates brake pressures based on the brake pedal depression force. For example, the brake master cylinder 3 is a tandem master cylinder including a primary piston for generating a brake pressure for front-left and rear-right wheel brakes and a secondary piston for generating a brake pressure for front-right and rear-left wheel brakes. In the tandem master cylinder, the primary piston and the secondary piston are arranged in series.

With this configuration, the brake master cylinder 3 may be regarded as a brake pressure control mechanism that increases a brake pressure at a brake for a wheel on a right side and a brake pressure at a brake for a wheel on a left side to the same target brake pressure that is determined based on the brake pedal depression force.

Note that in the attitude change reduction structure 100, proportional valves may be provided between the brake master cylinder 3 and the rear-right wheel brake and between the brake master cylinder 3 and the rear-left wheel brake so that the brake pressures at the front-right and front-left wheel brakes differ from those for the rear-right and rear-left wheel brakes. In this case, the brake master cylinder 3 makes the brake pressures generated at the front-right and front-left wheel brakes equal to each other, and makes the brake pressures generated at the rear-right and rear-left wheel brakes equal to each other.

Each brake tube 4 transmits a brake pressure generated at the brake master cylinder 3 to the brake hoses 5. For example, each brake tube 4 is made of metal that is hardly expanded by a brake pressure, and transmits the brake pressure generated at the brake master cylinder 3 to the brake hoses 5 without delay.

The brake tubes 4 include a brake tube 4A and a brake tube 4B. The brake tube 4A connects the brake master cylinder 3 to the front-right wheel brake hose 5FR and the rear-left wheel brake hose 5RL. The brake tube 4B connects the brake master cylinder 3 to the front-left wheel brake hose 5FL and the rear-right wheel brake hose 5RR. Therefore, the braking forces for the right and left wheels are integrally controlled.

With this configuration, even when a leakage occurs in one of the brake tubes 4A and 4B (or a portion related to one of the brake tubes 4A and 4B) and a desired brake pressure cannot be generated, it is possible to perform braking without spinning the vehicle, as long as the other brake tube is normal. If braking is attempted using only the right brakes or only the left brakes, a yaw moment is generated, which may spin the vehicle.

Each brake hose 5 transmits the brake pressure, which is generated at the brake master cylinder 3 and transmitted to the brake hose 5 via the brake tube 4, to the brake caliper 6. For example, each brake hose 5 is formed of a plurality of rubber layers and resin fibers, and expands at a predetermined rate according to the brake pressure.

A rate of change in the brake pressure with respect to time varies depending on an amount of expansion of the brake hose 5. The rate of change in the brake pressure with respect to time decreases as the amount of expansion increases. In other words, the rate of change in the brake pressure with respect to time increases as the amount of expansion decreases.

The amount of expansion is a difference between a volume inside the brake hose 5 at a first brake pressure and a volume inside the brake hose 5 at a second brake pressure that is higher than the first brake pressure, and is determined based on characteristics (material, length, diameter, rigidity, etc.) of the brake hose 5. More specifically, the amount of expansion is a difference between the volume inside the brake hose 5 at the first brake pressure at which the brake hose 5 does not expand and the volume inside the brake hose 5 at the second brake pressure that is higher than the first brake pressure. Therefore, the amount of expansion can be increased, by selecting an appropriate material that allows for greater expansion of the brake hose 5 in the radial direction, or by increasing the diameter or the axial length of the brake hose 5.

In the attitude change reduction structure 100 according to the embodiment, when the vehicle structure is asymmetric in the left-right direction (for example, when the center of gravity of the vehicle is offset toward the right side from the center line extending in the longitudinal direction of the vehicle), the amount of expansion of the front-right wheel brake hose 5FR is smaller than that of the front-left wheel brake hose 5FL, and the amount of expansion of the rear-right wheel brake hose 5RR is smaller than that of the rear-left wheel brake hose 5RL, based on the left-right asymmetry.

With this configuration, the brake hoses 5 may be regarded as a brake pressure change rate differentiation structure that makes the rate of change in the brake pressure at the brake for the wheel on the right side with respect to time different from the rate of change in the brake pressure at the brake for the wheel on the left side with respect to time. In the embodiment, the rate of change in the brake pressure at the brake for the right wheel with respect to time is greater than the rate of change in the brake pressure at the brake for the left wheel with respect to time.

The brake caliper 6 presses a brake pad (not shown) against the brake rotor 7 using the brake pressure that is generated at the brake master cylinder 3 and transmitted via the brake tube 4 and the brake hose 5. Thus, the brake caliper 6 restricts the rotation of the brake rotor 7 that rotates with the wheel hub 8 and the wheel 9.

Next, changes in the vehicle attitude during braking will be described with reference to FIGS. 2A to 4C.

Figure 2A:
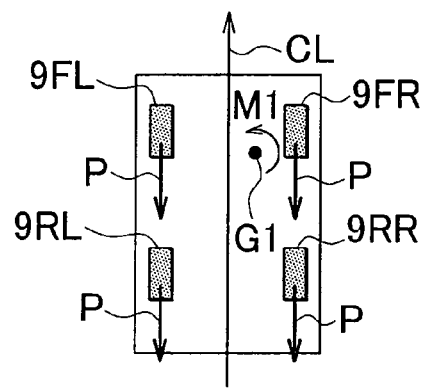
FIGS. 2A to 2C illustrate a vehicle attitude change during braking.
Figure 2B:
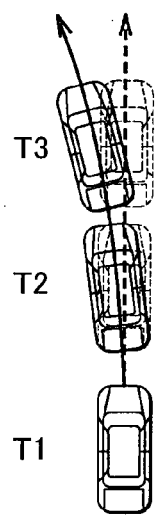
Figure 2C:
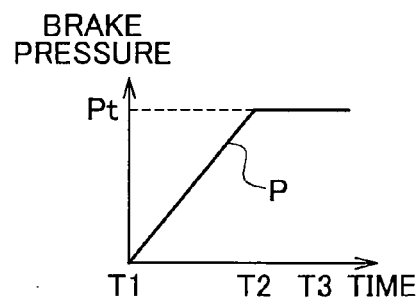

FIGS. 2A to 2C illustrate a change in attitude of the vehicle in which a center of gravity G1 is offset toward the right side from a center line CL extending in the longitudinal direction of the vehicle, when braking is performed while uniform brake pressures P are generated at the respective brakes for the four wheels of the vehicle.

Figure 3A:
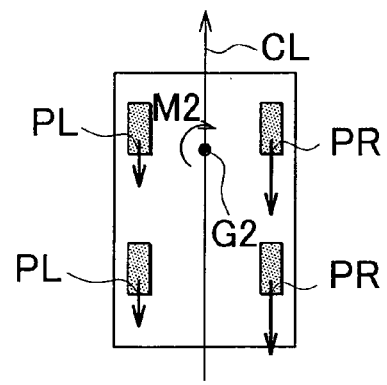
FIGS. 3A to 3C illustrate a vehicle attitude change during braking.
Figure 3B:
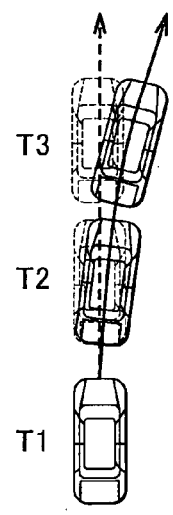
Figure 3C:
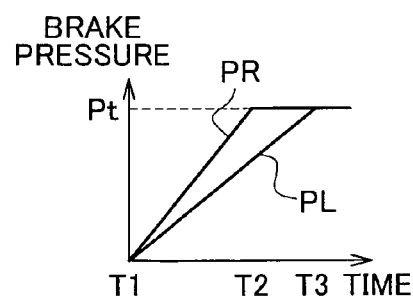

FIGS. 3A to 3C illustrate a change in attitude of the vehicle in which a center of gravity G2 is on the center line CL extending in the longitudinal direction of the vehicle, when braking is performed in a manner such that a brake pressures PR generated at each of the brakes for the front-right and rear-right wheels is greater than a brake pressure PL generated at each of the brakes for the front-left and rear-left wheels, until the brake pressures PR and PL reach a target brake pressure.

Figure 4A:
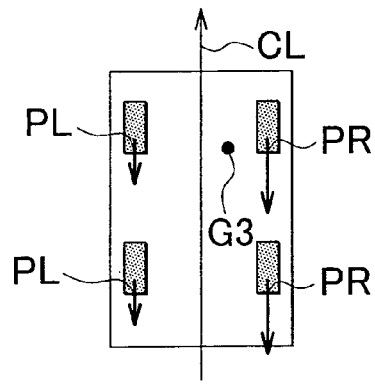
FIGS. 4A to 4C illustrate a vehicle attitude change during braking.
Figure 4B:
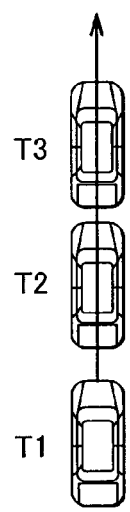
Figure 4C:
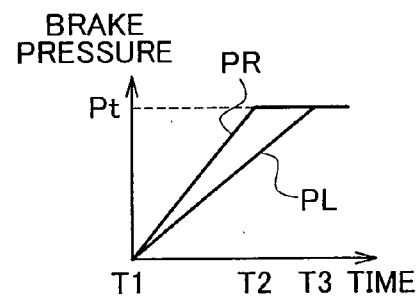

FIGS. 4A to 4C illustrate a change in attitude of the vehicle in which a center of gravity G3 is offset toward the right side from the center line CL extending in the longitudinal direction of the vehicle, when braking is performed in a manner such that the brake pressure PR generated at each of the brakes for the front-right and rear-right wheels is greater than the brake pressure PL generated at each of the brakes for the front-left and rear-left wheels, until the brake pressures PR and PL reach the target pressure (i.e., when braking is performed using the attitude change reduction structure 100).

FIGS. 2A, 3A, and 4A are top views of the vehicle for explaining the relationship between the brake pressures generated during braking and the yaw moment. FIG. 2A schematically shows the uniform brake pressures P that are generated at the respective brakes for the four wheels and a counterclockwise yaw moment M1 generated at the center of gravity G1 due to the left-right asymmetry of the vehicle structure.

FIG. 3A schematically shows the brake pressures PL generated at the respective brakes for the front-left and rear-left wheels, the brake pressures PR generated at the respective brakes for the front-right and rear-right wheels, and a clockwise yaw moment M2 generated at the center of gravity G2 due to a difference in brake pressure between the right side and the left side.

FIG. 4A shows the relationship between the brake pressures and the yaw moment during braking of the vehicle provided with the attitude change reduction structure 100. Similarly to FIG. 3A, FIG. 4A schematically shows the brake pressures PL generated at the respective brakes for the front-left and rear-left wheels and the brake pressures PR generated at the respective brakes for the front-right and rear-right wheels. Note that FIG. 4A shows that the yaw moment M1 generated due to the left-right asymmetry of the vehicle structure shown in FIG. 2A is canceled out by the yaw moment M2 generated due to the difference in brake pressure between the right side and the left side, so that the yaw moment is not generated at the center of gravity G3.

FIGS. 2B, 3B, and 4B each show a vehicle attitude at times T1, T2, and T3 (T1<T2<T3). FIG. 2B shows a state in which the vehicle is deflected toward the left side due to the counterclockwise yaw moment M1 generated at the center of gravity G1.

FIG. 3B shows a state in which the vehicle is deflected toward the right side due to the clockwise yaw moment M2 generated at the center of gravity G2.

FIG. 4B shows a state in which the vehicle is stopping while traveling straight forward because the yaw moment does not exist at the center of gravity G3 (the clockwise yaw moment and the counterclockwise yaw moment cancel out each other).

FIGS. 2C, 3C, and 4C show changes in the brake pressures with respect to time. FIG. 2C shows a change in the brake pressure P at each of the brakes for the four wheels with respect to time, and shows a state in which the brake pressures at the respective brakes for the four wheels uniformly increase until the brake pressures reach a target brake pressure Pt corresponding to the depression amount of the brake pedal 1. Also, FIG. 2C shows that the brake pressure P reaches the target brake pressure Pt at the time T2.

FIGS. 3C and 4C each show a change in the brake pressure PL at each of the brakes for the front-left and rear-left wheels with respect to time, and a change in the brake pressure PR at each of the brakes for the front-right and rear-right wheels with respect to time. FIGS. 3C and 4C also show that the brake pressure PR reaches the target brake pressure Pt at the time T2, and the brake pressure PL reaches the target brake pressure Pt at the time T3 (after the brake pressure PR reaches the target brake pressure Pt).

The manner in which the brake pressure at the brake for the right wheel changes with respect to time is different from the manner in which the brake pressure at the brake for the left wheel changes with respect to time, because the amount of expansion of the brake hose 5 on the right side is different from the amount of expansion of the brake hose 5 on the left side (in the embodiment, the amount of expansion of the front-right wheel brake hose 5FR is smaller than that of the front-left wheel brake hose 5FL, and the amount of expansion of the rear-right wheel brake hose 5RR is smaller than that of the rear-left wheel brake hose 5RL). Thus, the clockwise yaw moment M2 is generated at the center of gravity G2 shown in FIG. 3A, or the clockwise yaw moment is generated at the center of gravity G3 shown in FIG. 4A. Note that the clockwise yaw moment at the center of gravity G3 shown in FIG. 4A is canceled out by the counterclockwise yaw moment M1 due to the left-right asymmetry of the vehicle structure, and therefore, the clockwise yaw moment is not shown in FIG. 4A.

With this configuration, the attitude change reduction structure 100 cancels out the yaw moment (for example, the counterclockwise yaw moment) generated due to the known left-right asymmetry of the vehicle structure, by the counter yaw moment (the clockwise yaw moment) that is intentionally generated using the difference between the amount of expansion of the brake hose 5 on the right side and the amount of expansion of the brake hose 5 on the left side (i.e., the difference between the rate of change in the brake pressure at the brake for the right wheel with respect to time and the rate of change in the brake pressure at the brake for the left wheel with respect to time). Therefore, the change in the vehicle attitude (deflection of the vehicle) that occurs during braking is reduced or eliminated.

Further, the attitude change reduction structure 100 generates the counter yaw moment using the difference between the amount of expansion of the brake hose 5 on the right side and the amount of expansion of the brake hose 5 on the left side, without detecting brake pressures at the respective brakes for the right and left wheels using pressure sensors to separately control the brake pressures. Therefore, a simple and low-cost structure is provided.

Although the embodiment has been described above, the invention is not limited to the above embodiment, and various modifications and replacements may be made within the scope of the invention.

For example, in the attitude change reduction structure 100 according to the above embodiment, when the center of gravity of the vehicle is offset toward the right side from the center line extending in the longitudinal direction of the vehicle, the amount of expansion of the front-right wheel brake hose 5FR is smaller than that of the front-left wheel brake hose 5FL, and the amount of expansion of the rear-right wheel brake hose 5RR is smaller than that of the rear-left wheel brake hose 5RL, based on the state of the vehicle. However, the configuration may be such that the amount of expansion of the front-right wheel brake hose 5FR is smaller than that of the front-left wheel brake hose 5FL while the amount of expansion of the rear-right wheel brake hose 5RR is equal to the amount of expansion of the rear-left wheel brake hose 5RL.

To the contrary, in the attitude change reduction structure 100, when the center of gravity of the vehicle is offset toward the left side from the center line extending in the longitudinal direction of the vehicle, the amount of expansion of the front-left wheel brake hose 5FL is smaller than that of the front-right wheel brake hose 5FR and the amount of expansion of the rear-left wheel brake hose 5RL is smaller than that of the rear-right wheel brake hose 5RR, based on the state of the vehicle. In this case as well, in the attitude change reduction structure 100, the amount of expansion of the rear-right wheel brake hose 5RR may be equal to the amount of expansion of the rear-left wheel brake hose 5RL.

Further, in the attitude change reduction structure 100 according to the above embodiment, because the amount of expansion of the brake hose on the right side is different from the amount of expansion of the brake hose on the left side, the counter yaw moment is generated until the brake pressures reach the target brake pressure. The volume of the brake hose on the right side may be different from the volume of the brake hose on the left side. The brake hose on the right side and the brake hose on the left side may be different from each other in at least one of a diameter and an axial length. With this configuration, the counter yaw moment is generated until the brake pressures reach the target brake pressure.

Although the attitude change reduction structure 100 is applied to a disk brake system in the above embodiment, the attitude change reduction structure 100 may be applied to a drum brake system.

The invention claimed is:

1. An attitude change reduction structure that reduces a vehicle attitude change that occurs during braking due to known left-right asymmetry of a vehicle structure, the attitude change reduction structure comprising:
    a brake pressure control mechanism that increases a brake pressure at a brake for a wheel on a right side and a brake pressure at a brake for a wheel on a left side to a same target brake pressure; and
    a brake pressure change rate differentiation structure that makes a rate of change in the brake pressure at the brake for the wheel on the right side with respect to time different from a rate of change in the brake pressure at the brake for the wheel on the left side with respect to time, based on the known left-right asymmetry of the vehicle structure, wherein
    the brake pressure change rate differentiation structure includes brake hoses on the right and left sides, and an amount of expansion of the brake hose on the right side is different from an amount of expansion of the brake hose on the left side; and
    the amount of expansion of the brake hose on one of the right and left sides is smaller than the amount of expansion of the brake hose on the other of the right and left sides so that the rate of change in the brake pressure at the brake for the wheel on the one of the right and left sides with respect to time is greater than the rate of change in the brake pressure at the brake for the wheel on the other of the right left sides with respect to time.

2. The attitude change reduction structure according to claim 1, wherein
    when a vehicle is deflected toward one of the right and left sides during braking due to the known left-right asymmetry of the vehicle structure, the brake pressure change rate differentiation structure makes the rate of change in the brake pressure at the brake for the wheel on one of the right and left sides with respect to time greater than the rate of change in the brake pressure at the brake for the wheel on the other of the right and left sides with respect to time.

3. The attitude change reduction structure according to claim 1, wherein
the amount of expansion is a difference between a volume inside the brake hose at a first brake pressure at which the brake hose does not expand, and a volume inside the brake hose at a second brake pressure that is higher than the first brake pressure.

4. The attitude change reduction structure according to claim 1, wherein
the brake hose on the right side includes a front-right wheel brake hose and a rear-right wheel brake hose, and the brake hose on the left side includes a front-left wheel brake hose and a rear-left wheel brake hose; and
when a center of gravity of the vehicle is offset toward the right side from a center line extending in a longitudinal direction of the vehicle, the amount of expansion of the front-right wheel brake hose is smaller than that of the front-left wheel brake hose, and the amount of expansion of the rear-right wheel brake hose is smaller than that of the rear-left wheel brake hose.

5. The attitude change reduction structure according to claim 1, wherein
the brake hose on the right side includes a front-right wheel brake hose and a rear-right wheel brake hose, and the brake hose on the left side includes a front-left wheel brake hose and a rear-left wheel brake hose; and
when a center of gravity of the vehicle is offset toward the right side from a center line extending in a longitudinal direction of the vehicle, the amount of expansion of the front-right wheel brake hose is smaller than the amount of expansion of the front-left wheel brake hose, and the amount of expansion of the rear-right wheel brake hose is equal to the amount of expansion of the rear-left wheel brake hose.

6. The attitude change reduction structure according to claim 1, wherein
the brake hose on the right side includes a front-right wheel brake hose and a rear-right wheel brake hose, and the brake hose on the left side includes a front-left wheel brake hose and a rear-left wheel brake hose; and
when a center of gravity of the vehicle is offset toward the left side from a center line extending in a longitudinal direction of the vehicle, the amount of expansion of the front-left wheel brake hose is smaller than that of the front-right wheel brake hose, and the amount of expansion of the rear-left wheel brake hose is smaller than that of the rear-right wheel brake hose.

7. The attitude change reduction structure according to claim 1, wherein
the brake hose on the right side includes a front-right wheel brake hose and a rear-right wheel brake hose, and the brake hose on the left side includes a front-left wheel brake hose and a rear-left wheel brake hose; and
when a center of gravity of the vehicle is offset toward the left side from a center line extending in a longitudinal direction of the vehicle, the amount of expansion of the front-left wheel brake hose is smaller than that of the front-right wheel brake hose, and the amount of expansion of the rear-right wheel brake hose is equal to the amount of expansion of the rear-left wheel brake hose.

8. The attitude change reduction structure according to claim 1, wherein
the brake hoses on the right and left sides are connected by a brake tube.

9. The attitude change reduction structure according to claim 1, wherein
the known left-right asymmetry of the vehicle structure is a difference between a load applied to the wheel on the right side and a load applied to the wheel on the left side; and
the brake pressure change rate differentiation structure makes the rate of change in the brake pressure at the brake for the wheel, to which a larger load is applied, with respect to time greater than the rate of change in the brake pressure at the brake for the wheel, to which a smaller load is applied, with respect to time.

10. The attitude change reduction structure according to claim 1, wherein
the target brake pressure is determined based on a depression amount of a brake pedal.

* * * * *